United States Patent
Wallace et al.

(10) Patent No.: US 6,947,575 B2
(45) Date of Patent: Sep. 20, 2005

(54) APPARATUS AND METHOD FOR DETERMINING VEHICLE OCCUPANT CHARACTERISTIC UTILIZING IMAGING WITH PROVIDED LIGHT

(75) Inventors: Jon K. Wallace, Redford, MI (US); Farid Khairallah, Farmington Hills, MI (US); Nicholas M. Zayan, Fenton, MI (US); Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 571 days.

(21) Appl. No.: 09/865,154

(22) Filed: May 24, 2001

(65) Prior Publication Data

US 2002/0181742 A1 Dec. 5, 2002

(51) Int. Cl.[7] .................................................. G06K 9/00
(52) U.S. Cl. ...................... 382/104; 701/45; 280/730.1; 180/271
(58) Field of Search .................................. 382/100, 103, 382/104, 107; 701/45, 49; 180/271; 280/728.1, 731, 730.1, 732, 734, 735; 340/425.5, 429, 426.1, 436; 348/143, 148

(56) References Cited

U.S. PATENT DOCUMENTS

| | | | |
|---|---|---|---|
| 4,937,878 A | 6/1990 | Lo et al. | |
| 5,008,946 A | * 4/1991 | Ando | 382/104 |
| 5,528,698 A | 6/1996 | Kamei et al. | |
| 5,531,472 A | 7/1996 | Semchena et al. | |
| 5,546,475 A | * 8/1996 | Bolle et al. | 382/190 |
| 5,621,457 A | * 4/1997 | Ishiwaka et al. | 348/78 |
| 5,829,782 A | 11/1998 | Breed et al. | |
| 5,834,765 A | 11/1998 | Ashdown | |
| 5,845,000 A | * 12/1998 | Breed et al. | 382/100 |
| 5,970,166 A | * 10/1999 | Nichani | 382/141 |
| 5,983,147 A | 11/1999 | Krumm | |
| 6,005,958 A | 12/1999 | Farmer et al. | |
| 6,049,747 A | 4/2000 | Nakajima et al. | |
| 6,144,366 A | * 11/2000 | Numazaki et al. | 345/156 |
| 6,498,867 B1 | * 12/2002 | Potucek et al. | 382/274 |
| 6,538,751 B2 | * 3/2003 | Ono | 356/614 |

* cited by examiner

*Primary Examiner*—Samir Ahmed
*Assistant Examiner*—Anand Bhatnagar
(74) *Attorney, Agent, or Firm*—Tarolli, Sundheim, Covell & Tummino L.L.P.

(57) ABSTRACT

An apparatus (30) and associated method determine a vehicle occupant characteristic. An imager (32) collects a first image of an occupant location while the occupant location is subject to a first lighting condition. A light source (38) provides light onto the occupant location. The imager (32) collects a second image of the occupant location while the occupant location is subject to the first lighting condition and the provided light. A subtractor device (50) generates a third image of the occupant location indicative of the difference between the first and second images. An image processing device (52) processes the third image to determine the vehicle occupant characteristic.

15 Claims, 5 Drawing Sheets

ApparatusApparatus AND METHOD FOR
DETERMINING VEHICLE OCCUPANT
CHARACTERISTIC UTILIZING IMAGING
WITH PROVIDED LIGHT

TECHNICAL FIELD

The present invention is related to a vehicle occupant protection system and is particularly directed to determination of an occupant characteristic utilizing imaging with provided light for use in control of the occupant protection system.

BACKGROUND OF THE INVENTION

Vehicle occupant protection systems that have an actuatable protection device are known in the art. The actuatable protection device of such a system is actuated upon the occurrence of a condition for which a vehicle occupant is to be protected. An example of a condition for which a vehicle occupant is to be protected is a vehicle collision.

One type of actuatable protection system includes an air bag module mounted within a vehicle such that an air bag of the module is inflatable within an occupant compartment of the vehicle. The air bag is inflated upon the occurrence of a condition, such as a vehicle collision. Another type of actuatable protection system has a seat belt extendable across a vehicle occupant and includes an actuatable device, such as a pretensioner, to move at least a portion of the seat belt relative to the occupant. The pretensioner removes slack from the seat belt to limit occupant movement, and is actuated upon the occurrence of a condition, such as a vehicle collision.

An actuatable occupant protection system includes one or more sensors for sensing one or more parameters that are indicative of a condition for which the vehicle occupant is to be protected. For example, one sensor is a collision sensor that provides a signal indicative of a vehicle collision condition. The one or more sensors provide signals to a controller. The controller evaluates the signal(s) and determines whether to actuate the associated protection device.

One type of actuatable protection system has one or more adjustable aspects that are adjusted to change the actuation (i.e., deployment) of the protection device. For example, in a system that includes an air bag, the deployment profile of the air bag is adjustable. The adjustable aspects regarding the deployment profile of the air bag may include adjustment of a timing sequence for inflation, adjustment of pressure within the air bag during inflation and upon completion of inflation, and adjustment of air bag position with respect to the occupant.

To make determinations regarding adjustment, one or more characteristics of an occupant are sensed or are derived from occupant sensory information. Examples of occupant characteristics include: size of the occupant, weight of the occupant, position of the occupant, and distance between the occupant and a surface of a vehicle component (e.g., an air bag module).

A number of occupant imaging devices have been developed to provide sensory information regarding a vehicle occupant. In particular, an imaging device has been developed that projects structured (e.g., provided in a pattern) light onto object(s), such as the occupant and a vehicle seat, and that collects an image of the object(s) illuminated with the structured light. Determinations are made regarding detected changes (e.g., warping) of the light by features of the object(s) that the light overlays. In turn, information is deduced and used to determine occupant presence, position, range/distance, and even three-dimensional contour shape.

In addition, a device has been developed that analyzes pixel coordinates within an image of an object to determine the angular position of the imaged object within a field of view of an imager. Still further, a device has been developed that uses an imager to make a determination of major movement of an object, such as an occupant, moving across a field of view of the imager. Specifically, the imager is located such that movement of the object is transverse to a major viewing access of the imager.

A major drawback of such known devices includes a washing-out effect on structured light that is overlaid upon an object already illuminated by overly bright ambient lighting conditions. Examples of such overly bright ambient light conditions may be due to sunlight shining into a vehicle interior. One possible solution for dealing with overly bright ambient lighting conditions is to provide the structured light at a very high intensity. However, provision of very high intensity structured light typically results in undesirable high dollar costs for the necessary equipment. Another alternative is just to accept the loss of performance during such overly bright ambient lighting conditions.

Still further, other drawbacks of the known devices can produce effects that degrade performance. In one example, a correlation between range to an occupant is complicated by parallax effects as the occupant moves toward or away from the imager.

SUMMARY OF THE INVENTION

In accordance with one aspect, the present invention provides an apparatus for determining a vehicle occupant characteristic. Means collects a first image of an occupant location while the occupant location is subject to a first lighting condition. Means provides light onto the occupant location. Means collects a second image of the occupant location while the occupant location is subject to the first lighting condition and the provided light. Means generates a third image of the occupant location indicative of the difference between the first and second images. Means processes the third image to determine the vehicle occupant characteristic.

In accordance with another aspect, the present invention provides a method for determining a vehicle occupant characteristic. A first image of an occupant location is collected while the occupant location is subject to a first lighting condition. Light is provided onto the occupant location. A second image of the occupant location is collected while the occupant location is subject to the first lighting condition and the provided light. A third image of the occupant location indicative of the difference between the first and second images is generated. The third image is processed to determine the vehicle occupant characteristic.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
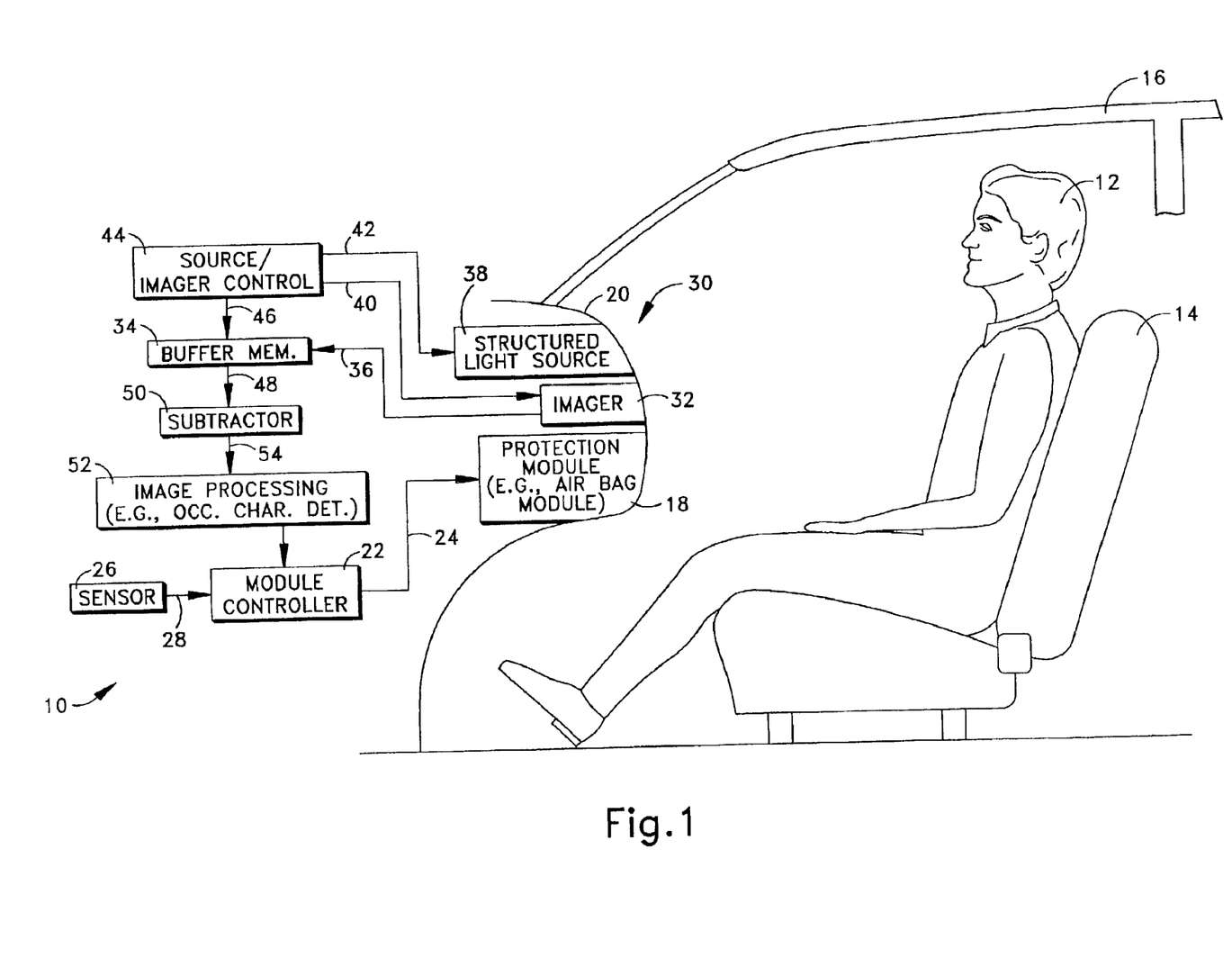
FIG. 1 is a schematic illustration of a vehicle that has an occupant protection system with an apparatus in accordance with the present invention.

An occupant protection system 10 is schematically illustrated in FIG. 1. The system 10 is provided for an occupant 12 seated on a vehicle seat 14 within a vehicle 16. The system 10 includes an actuatable occupant protection device 18 that is provided as a module. The protection module 18 is associated with the vehicle seat 14 and thus an occupant seating location provided at the seat. In one example, the protection module 18 includes an inflatable component, commonly referred to as an air bag. The air bag is inflatable within an occupant compartment of the vehicle 16. In the illustrated example, the protection module 18 is located within a dashboard or instrument panel 20 of the vehicle 16 and the vehicle seat 14 is a front passenger seat.

It is to be appreciated that the specific type and the location of the protection device are not limitations on the present invention. In other words, features of the protection device may be changed without departing from the present invention. For example, another type of protection device (e.g., a driver's side protection module or a side curtain module) may be provided in the system and/or the protection device may be located elsewhere within the vehicle (e.g., on the steering wheel). The system may include a protection device that does not have an inflatable component, such as an actuatable knee bolster or a seat belt system with an actuatable portion (e.g., a pretensioner). Also, it is to be appreciated that the system may include a plurality of actuatable protection devices.

In one example, the protection module 18 may also have at least one adjustable aspect. For example, the deployment of the air bag is adjusted. Examples of air bag deployment adjustment include adjustment of inflation timing, adjustment of inflation pressure, adjustment of location of the inflated air bag relative to the occupant, and adjustment of the dynamic profile of the air bag during inflation. A specific example of adjustment to inflation timing is selection of a time period between a determination to actuate the protection module and an initiation of the air bag inflation. A specific example of adjustment of inflation pressure is control of a pressure release valve that vents the air bag. Dynamic profile control is accomplished by directing inflation fluid into the air bag in predetermined zones within the air bag during inflation.

A specific example of adjustment of air bag positioning is control of positioning motors operative to move an air bag housing. Another specific example of adjustment of air bag positioning is moving the entire protection module toward or away from the occupant and/or moving the occupant toward or away from the protection module.

Control of the protection module 18, to adjust any adjustable aspect(s) and to cause actuation of the protection module is by a controller 22 that is operatively connected 24 to provide control signals to the protection module. In one example, the controller 22 includes a microcomputer. The controller 22 receives sensory input from several sources and, using the sensory input, makes determinations regarding protection module control.

One of the sensory input sources for the controller 22 is a sensor 26 that senses a vehicle condition for which an occupant is to be protected, and that is operatively connected 28 to provide a signal to the controller indicative of the sensed vehicle condition. In one example, the sensor 26 is a crash sensor that senses a condition that is indicative of a vehicle crash. In a specific example, the crash sensor is an accelerometer, and the signal provided therefrom is an electrical signal that has a voltage value indicative of the sensed acceleration and/or a frequency value indicative of the sensed acceleration. In another specific example, the sensor 26 senses a condition indicative of a vehicle rollover. It is to be appreciated that the system 10 could have a plurality of sensors 26 providing signals to the controller 22 that are indicative of vehicle conditions for which the occupant 12 is to be protected. Hereinafter, only the single crash sensor 26 and its crash indicative signal are discussed.

An apparatus 30 for determining a vehicle occupant characteristic in accordance with the present invention provides another input for the controller 22. The occupant characteristic can be any characteristic, such as presence, location, movement, size, type, etc. In the illustrated example of FIG. 1, at least some portion of the apparatus 30 is mounted in the instrument panel 20 near the protection module 18. However, it is to be appreciated upon further reading that other locations for certain portions of the apparatus 30 are possible.

The apparatus 30 includes an imager 32 for collecting two-dimensional images of the occupant location. It is to be appreciated that the imager 32 has suitable structure for accomplishing the task of collecting two-dimensional images. For example, the imager 32 includes focusing optics, a receiving device such as a charge couple display, etc. In the illustrated example, the imager 32 is mounted within the instrument panel 20 at a location adjacent to the protection module 18.

A buffer memory 34 of the apparatus 30 is operatively connected 36 to the imager 32. The buffer memory 34 stores a plurality of collected images for use in later processing.

A light source 38 of the apparatus 30 is located within the instrument panel 20, and has a structure/configuration to provide light onto the occupant location. In one example, the structure of the light source 38 includes a lens arrangement that provides the effect of a virtual source at a location spaced from the actual light source. In the illustrated example embodiment, the light source 38 is adjacent to the imager 32.

In one example, the light is provided (i.e., output) only during a relatively short duration. Specifically, the light is provided in a strobe light fashion. Further, in one example, the light is provided at an intensity that is at some fractional percentage of the intensity of the ambient lighting at the occupant location. In one specific example, the intensity of the provided light is at $\frac{1}{8}$ of the intensity of the ambient lighting. In another specific example, the intensity of the provided light is at $\frac{1}{16}$ of the intensity of the ambient lighting. Still further, in an example, the light is provided in or near the infrared spectral range such that the provided light is not visible to humans.

In the illustrated embodiment, the light source 38 provides the light as structured light. In one example, the structured light has a pattern that includes a plurality of stripes (e.g., horizontal or vertical), dots, etc. However, it is to be appreciated that use of structured light is not a limitation on the present invention.

The provision of the structured light onto the occupant location is such that changes (e.g., distortions), etc. of the structured light are indicative of at least one occupant characteristic. In the illustrated embodiment, the changes that indicate occupant characteristic(s) can include warping of the shape of the provided light pattern. In particular, the changes in size and shape of the structured light pattern across the field of view are indicative, and are thus used to determine, range and shape. In other words, determinations about two-dimensional image classification and three-dimensional distances are obtainable.

The imager 32 and the light source 38 are operatively connected 40, 42, respectively, to a source/imager control device 44. The control device 44 controls the imager 32 and light source 38 such that an image is gathered while the light source is not providing the light. The collected image is stored in the buffer memory 36. At a different time (e.g., subsequently), the light source 38 is controlled to provide the light. During provision of the light onto the occupant location, the imager 32 is controlled to collect another image of the occupant location. The collected image is also stored in the buffer memory 36. The time space between the collection of the two images is very short such that the collected images have little or no difference, except for the absence and presence of the provided light.

The buffer memory 36 is operatively connected 46 to the control device 44, such that the storage of images is correlated with the control of image gathering. The buffer memory 36 is also operatively connected 48 to a subtractor device 50. The two collected images are provided to the subtractor device 50 and the subtractor device subtracts the image based solely upon ambient light from the image that is based upon ambient light and the provided light. The result is an image that is derived solely from the provided light. As such, the derived image is generated and is referred to as a third image.

The third image avoids issues that could arise from natural variations in the ambient light. This may be especially true for an imaged surface that is complex and/or has a pattern (e.g., clothing with a pattern). Also, for the use of patterned light, the contrast between illuminated and non-illuminated portions is greatly enhanced. Within the limits of noise and other interference and system limitations, the non-illuminated portions appear as null (e.g., black) portions.

The third image of the occupant location is provided to an image processing device 52 that is operatively connected 54 to the subtractor device 50. Within the image processing device 52, the changes (e.g., distortion such as warping) of the light pattern by the surfaces of the occupant, etc., are analyzed to make a determination regarding an occupant characteristic. As one example, the image processing includes pixel-by-pixel analysis. For the example of the structured light being striped, the changes in width are analyzed.

It is to be appreciated that the image processing can be done by any suitable technique, including known techniques of analyzing changes (e.g., distortion such as warping, changes in size, etc.) to make determinations about the surface(s) that causes the changes. The processing may include mapping between pixel coordinates and angular position in the field of view relative to the imager 32 to determine angular position of features of interest. Also, the processing may include triangulation between derived range distance and angular information to determine three-dimensional location of features of interest. Of course, it is to be further appreciated that the processing takes place without adverse effects caused by ambient light because the subtractor device 50 removes the aspects of the image that are caused solely by the ambient light.

On another level, the subtracting and processing include any appropriate sub-steps that aid in the generation/handling of the third image. For example, the third image may be amplified (e.g., a gain of 8/1 if the light was provided at ⅛ of ambient intensity). Also, the first two images or the third image may be digitized. As such, the subtraction may be done in analog or digital. On a few minor points it is to be noted that it appears that a low provided light intensity results in a corresponding amount of decrease in color depth. Subtracting in analog before digitizing for the third image may help alleviate loss of color depth. Also, an increase capacity for resolution may help alleviate loss of color depth. For example, it might be useful to utilize a 10 or 12 bit analog-to-digital converter rather than an 8 bit converter.

Figure 2:
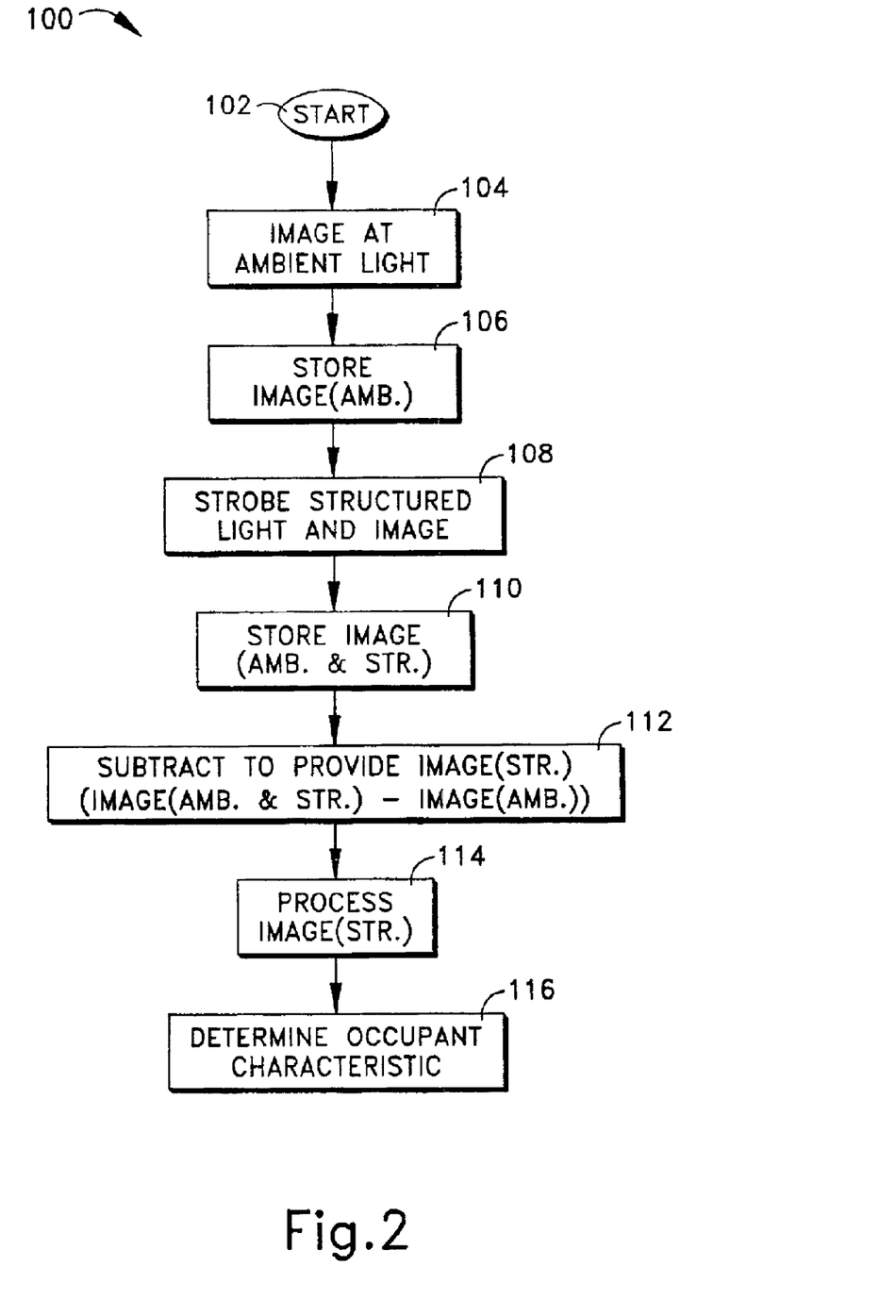
FIG. 2 is a flow chart of a process performed in accordance with the present invention.
Figure 3:
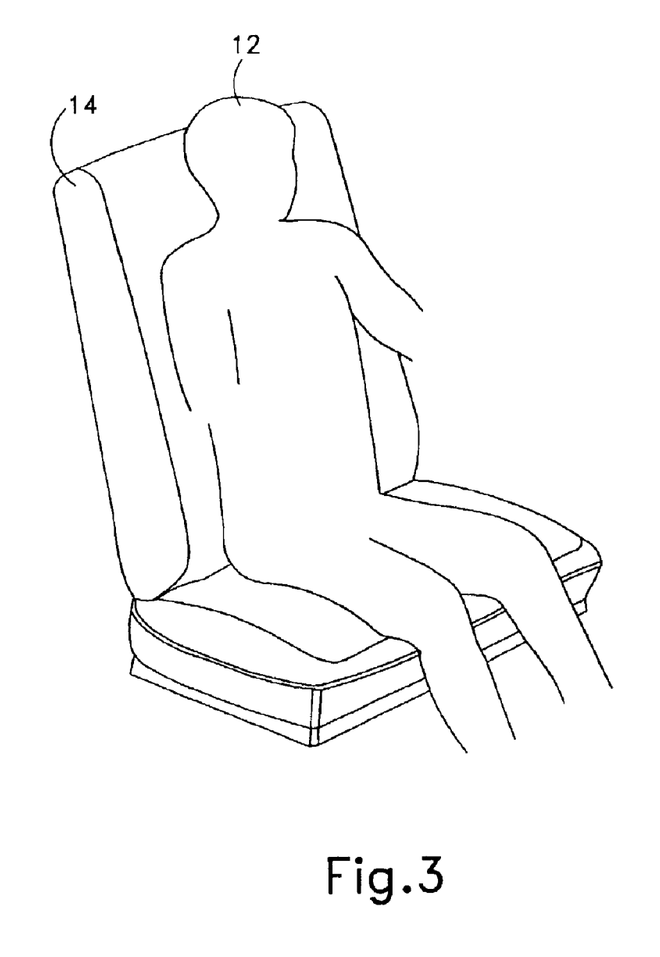
FIG. 3 is an illustration of an occupant seating location subject to a first lighting condition.

FIG. 2 shows an example of a process 100 performed within the apparatus 30 of FIG. 1. The process 100 (FIG. 2) is initiated at step 102 and proceeds to step 104 in which the occupant location is imaged with just the ambient light. FIG. 3 shows the occupant location, with a schematic representation of the occupant 12, illuminated by the ambient light.

Figure 4:
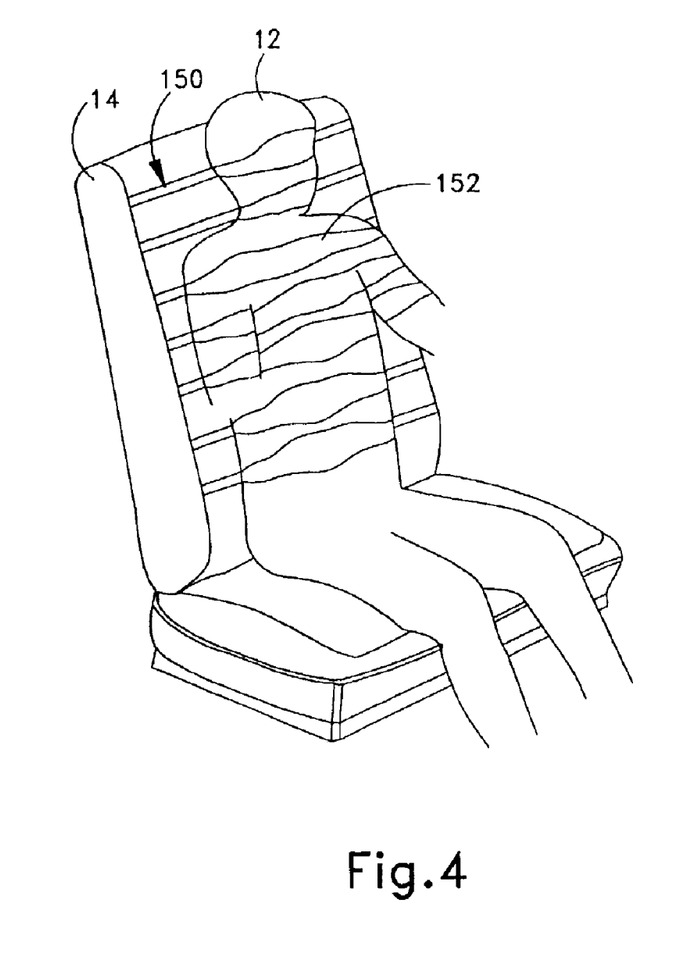
FIG. 4 is an illustration similar to FIG. 3, but with an example light provided onto the occupant location.

At step 106 (FIG. 2), the image gathered for the ambient lighting condition is stored. At step 108, the light source 38 is turned ON (e.g., strobe ON) to provide the structured light, and another image is gathered. FIG. 4 illustrates the occupant seating location with the ambient and example, provided, structured light. The example provided light has a stripe pattern, and is identified by reference numeral 150. It is to be noted that the structured light is changed (e.g., warped) due to the presence of the occupant 12 and the contour of the occupant's body. The change is identified by the reference numeral 152.

At step 110, the image gathered for the ambient and provided light is stored. At step 112, the stored image gathered during just ambient lighting condition is subtracted from the stored image gathered during the provision of the light. The subtraction provides the image (i.e., the third image) based upon the provided light and clearly indicates the changes (e.g., warping) caused by the presence of the occupant.

At step 114, the third image (i.e., the image of the occupant location due solely to structured light) is processed. The processing includes any useful image processing technique. For example, distortions of the lines of the structured light are discerned. At step 116, at least one occupant characteristic (e.g., occupant presence, location, etc.) is determined utilizing information derived from the image processing.

FIGS. 5–8 illustrate a portion of a second embodiment of an apparatus 230 for determining a vehicle occupant characteristic in accordance with the present invention. It is to be appreciated that the apparatus 230 may have many similar components (some not shown) and functions as the apparatus 30 (FIG. 1) of the first embodiment. Moreover, it is to be appreciated that the apparatus 230 (FIG. 5) may provide sensory input within an occupant protection system (not shown) similar to the occupant protection system 10 shown in FIG. 1.

The apparatus 230 of FIGS. 5–8 differs from the apparatus 30 of FIG. 1 in that an imager 232 and a light source 238 are located to a side (i.e., laterally located) of the occupant seating location with regard to a vehicle-based orientation. It is to be recalled that the embodiment shown in FIG. 1 has the imager 32 and the light source 38 located forward (e.g., within the instrument panel 20) of the occupant seating location.

Figure 5:
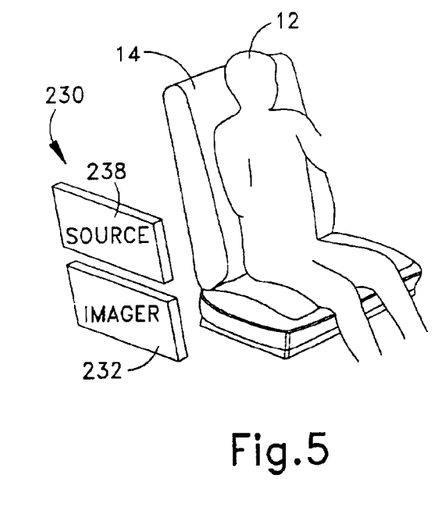
FIG. 5 is an illustration of a portion of an apparatus in accordance with a second embodiment of the present invention, and an occupant seating location subject to a first lighting condition.

Turning to FIG. 5, the light source 238 and the imager 232 provide and sense, respectively, light such that movement of the occupant 12 along a vehicle fore-to-aft axis can be easily detected. In the illustrated example of FIG. 6, the provided light is structured light. Further in the example of FIG. 6, the light 250 is provided as a plurality of beams.

Figure 6:
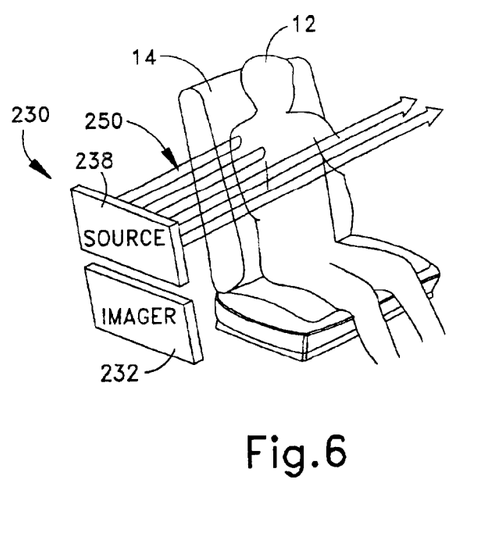
FIG. 6 is an illustration similar to FIG. 5, but with light provided onto the occupant location.
Figure 7:
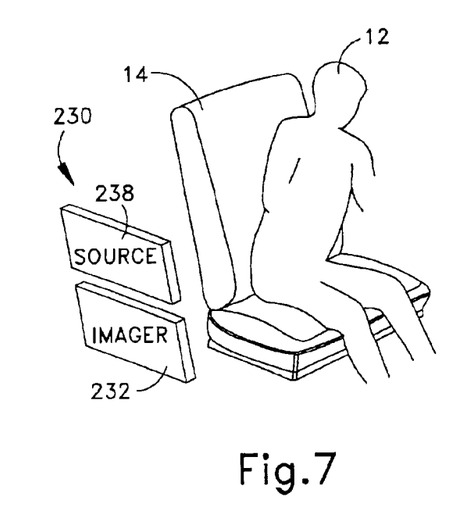
FIG. 7 is a view similar to FIG. 5, but with the occupant at a different position.
Figure 8:
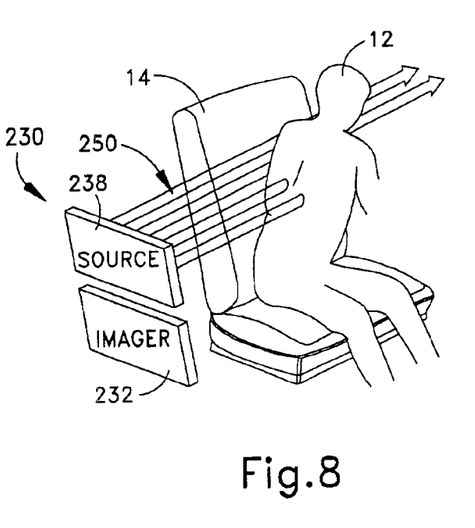
FIG. 8 is a view similar to FIG. 7, but with the light provided onto the occupant location.

The interaction of the light 250 with the occupant 12 varies dependent upon the position of the occupant. The change in the interaction is detected utilizing the present invention.

Figure 9:
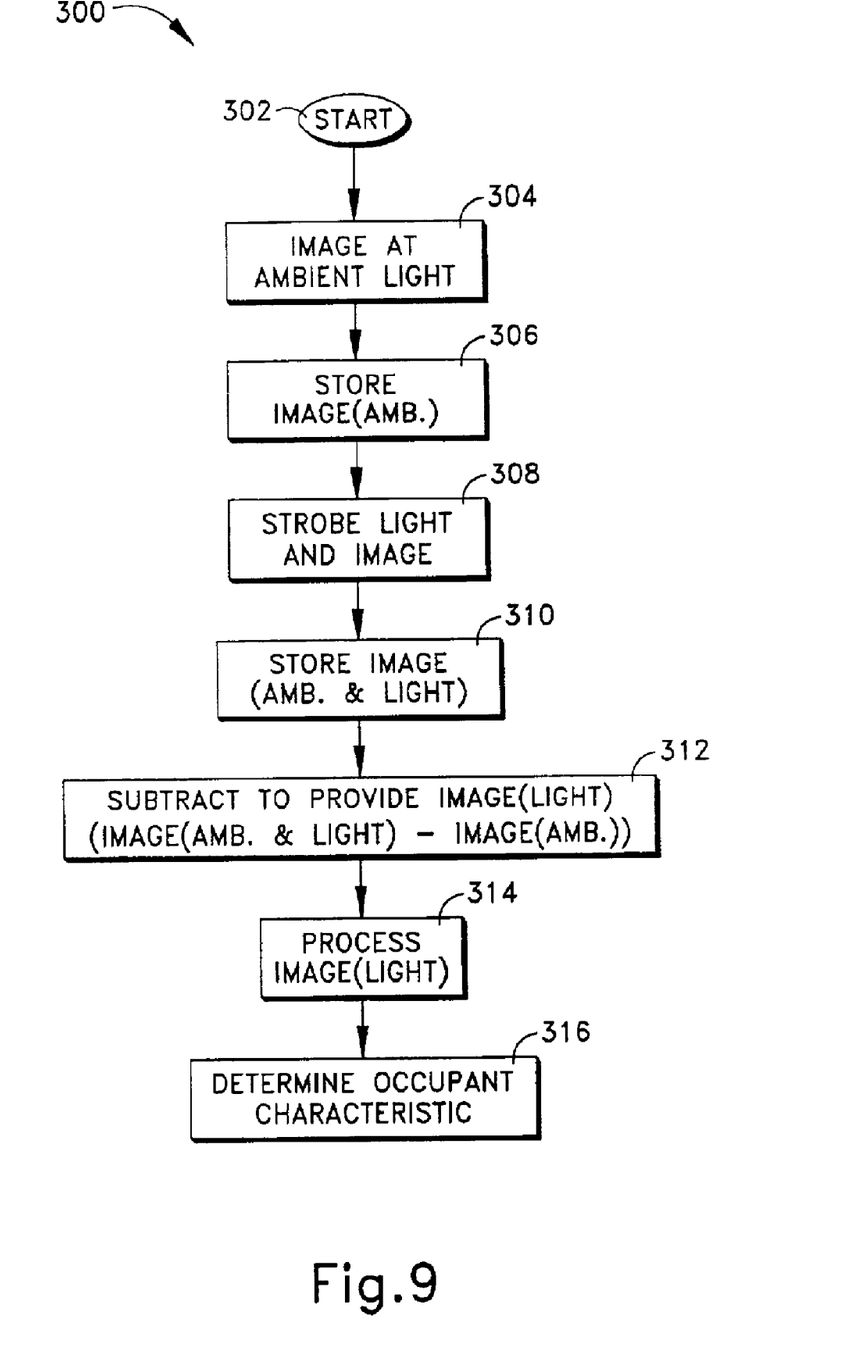
FIG. 9 is a flow chart for yet another process performed in accordance with the present invention.

FIG. 9 is an example of a process 300 performed within the apparatus 230 of FIGS. 5–8. The process 300 is initiated at step 302 and proceeds to step 304. At step 304, the occupant location is imaged at ambient light, as is shown, for example, within FIG. 5. At step 306 (FIG. 9), the image at ambient light is stored. At step 308, the light source 238 is ON (e.g., strobe) and an image is gathered with the ambient light and provided light. The provided light 250 is shown, for example, in FIG. 6.

At step 310 (FIG. 9), the image for the ambient and provided light is stored. At step 312, a subtraction to provide an image based only upon the provided light is accomplished. Specifically, the image that is based upon the ambient light is subtracted from the image provided via the ambient and provided light. At step 314, the image based upon the provided light is processed. At step 316, at least one occupant characteristic is determined. For example, the position of the occupant 12 along the fore-to-aft axis, with regard to the vehicle-based orientation, is determined.

The process 300 is repeated and thus further determinations regarding occupant characteristics are made. For example, in FIG. 7, the occupant position differs from that of FIG. 5. At FIG. 7, an image at ambient lighting condition is gathered. At FIG. 8, the light source 238 is ON (e.g., strobe ON), and an image is gathered. Within the process 300 (i.e., step 312), the two images are subtracted to provide an image based solely upon the provided light. The image is processed (i.e., step 314). The change in position of the occupant 12 from FIGS. 5 and 6 to FIGS. 7 and 8 can be determined as an occupant characteristic.

From the above description of the invention, those skilled in the art will perceive improvements, changes and modifications.

For example, it is to be appreciated that the sequence order of imaging gathering can be changed (e.g., imaging with ambient and provided light before imaging with just ambient light). Further, the structured light may be changed (e.g., variation of pattern type or light dimensions) to enhance the ability to discern details of occupant characteristics.

Also, although provision of the light as structured light permits advantages and abilities, it is to be appreciated that provision of non-structures light to accomplish gathering of two images and subtraction to generate a third image is within the broad scope of the present invention. Further on the point of use of non-structured light, non-structured, whole field illumination may be used to gather one image, and structured light may be used to gather another image. Subtraction to provide a third image has an associated benefit of reduction of effect caused by variation of ambient light.

Such improvements, changes and modifications within the skill of the art are intended to be covered by the appended claims.

What is claimed is:

1. An apparatus for determining a characteristic of an occupant of a vehicle, the apparatus comprising:
    means for collecting a first two-dimensional image of an occupant location while the occupant location is subject to a first lighting condition, the first lighting condition including lighting from ambient light;
    means for providing a pattern of light onto the occupant location, the pattern of light having an intensity that is less than an intensity of the ambient light;
    means for collecting a second two-dimensional image of the occupant location while the occupant location is subject to the first lighting condition and the provided pattern of light;
    means for generating a third image of the occupant location indicative of a difference between the first and second two-dimensional images; and
    means for analyzing the pattern of light in the third image to determine a three-dimensional characteristic of the occupant.

2. The apparatus as set forth in claim 1, wherein the means for providing the pattern of light comprises means to provide the pattern such that the pattern is at least partially distorted when impinging upon surfaces at the occupant location, the means for analyzing the pattern of light comprising means for analyzing distortions of the pattern to determine the three-dimensional characteristic of the occupant.

3. The apparatus as set forth in claim 2, wherein the means for analyzing distortions of the pattern to determine the three-dimensional characteristic of the occupant comprises means for determining the three-dimensional location of features of the occupant.

4. The apparatus as set forth in claim 1, wherein the means for collecting the first image and the means for collecting the second image are provided in a single component, the means for analyzing the pattern of light in the third image to determine the three-dimensional characteristic of the occupant comprises means for determining distance to an occupant at the occupant location from the single component.

5. The apparatus as set forth in claim 4, wherein the single component is located forward of the occupant location with regard to a vehicle-based orientation.

6. The apparatus as set forth in claim 5, wherein the means for providing the pattern of light directs light rearward onto the occupant location.

7. The apparatus as set forth in claim 4, wherein the single component is located lateral of the occupant location with regard to a vehicle-based orientation.

8. The apparatus as set forth in claim 7, wherein the means for analyzing the pattern of light in the third image to determine the three-dimensional characteristic of the occupant comprises means for determining a position of the occupant along a fore-to-aft axis of the vehicle.

9. The apparatus as set forth in claim 1, wherein the apparatus is part of an occupant protection system that includes an acutatable occupant protection device, the apparatus further comprising means for outputting a signal indicative of the determined three-dimensional characteristic of the occupant for use by the occupant protection system in controlling the actuatable occupant protection device.

10. A method for determining a characteristic of an occupant of a vehicle, the method comprising:

- collecting a first two-dimensional image of an occupant location while the occupant location is subject to a first lighting condition, the first lighting condition including lighting from ambient light;
- providing a pattern of light onto the occupant location, the pattern of light having an intensity that is less than an intensity of the ambient light;
- collecting a second two-dimensional image of the occupant location while the occupant location is subject to the first lighting condition and the provided pattern of light;
- generating a third image of the occupant location indicative of a difference between the first and second two-dimensional images; and
- analyzing the pattern of light in the third image to determine a three dimensional characteristics of the occupant.

11. The method as set forth in claim 10, wherein said step of providing the pattern of light comprises the step of providing the pattern such that the pattern is at least partially distorted when impinging upon surfaces at the occupant location, the step of analyzing the pattern of light comprising the step of analyzing distortions of the pattern to determine the three-dimensional characteristic of the occupant.

12. The method as set forth in claim 11, wherein the step of analyzing distortions of the pattern to determine the three-dimensional characteristic of the occupant comprises the step of determining a three-dimensional location of features of the occupant.

13. The method as set forth in claim 10, wherein the step of analyzing the pattern of light in the third image to determine the three-dimensional characteristic of the occupant comprises the step of determining distance to an occupant at the occupant location from a location of an imager for collecting the first and second two-dimensional images.

14. The method as set forth in claim 13, wherein the step of providing the pattern of light further includes the step of directing light rearward, relative to a vehicle-based orientation, onto the occupant location.

15. The method as set forth in claim 13, wherein the step of providing the pattern of light further includes the step of directing light laterally, relative to a vehicle-based orientation, the step of analyzing the pattern of light in the third image to determine a three-dimensional characteristic of the occupant comprises the step of determining a position of the occupant along a fore-to-aft axis of the vehicle.

* * * * *